(12) United States Patent
Pierce et al.

(10) Patent No.: US 7,689,820 B2
(45) Date of Patent: Mar. 30, 2010

(54) RAPID-BOOT COMPUTING DEVICE WITH DUAL OPERATING SYSTEMS

(75) Inventors: James R. Pierce, Cumming, GA (US); Eric H. Walker, Suwanee, GA (US); John A. Wahl, Duluth, GA (US)

(73) Assignee: L3 Communications Corporation, New York, NY (US)

( * ) Notice: Subject to any disclaimer, the term of this patent is extended or adjusted under 35 U.S.C. 154(b) by 737 days.

(21) Appl. No.: 11/535,803

(22) Filed: Sep. 27, 2006

(65) Prior Publication Data

US 2008/0077786 A1    Mar. 27, 2008

(51) Int. Cl.
*G06F 15/163* (2006.01)
*G06F 15/80* (2006.01)

(52) U.S. Cl. .................. 713/2; 713/1; 712/28; 712/203; 714/11; 714/13

(58) Field of Classification Search ............... 713/1, 713/2, 300, 400, 500, 322; 712/28, 203; 714/11, 13
See application file for complete search history.

(56) References Cited

U.S. PATENT DOCUMENTS

| | | | |
|---|---|---|---|
| 4,747,040 A | 5/1988 | Blanset et al. | |
| 4,799,145 A * | 1/1989 | Goss et al. ................. | 713/1 |
| 4,946,120 A | 8/1990 | Hatcher | |
| 5,278,973 A | 1/1994 | O'Brien et al. | |
| 5,301,334 A | 4/1994 | Horiuchi | |
| 5,430,883 A | 7/1995 | Horiuchi | |
| 5,555,491 A | 9/1996 | Tao | |
| 5,632,462 A | 5/1997 | Kallas | |
| 5,673,628 A | 10/1997 | Boos | |
| 5,751,548 A | 5/1998 | Hall et al. | |
| 5,859,762 A | 1/1999 | Clark et al. | |
| 5,931,929 A | 8/1999 | Tran et al. | |
| 6,005,368 A | 12/1999 | Frame | |
| 6,113,047 A | 9/2000 | Wung et al. | |
| 6,119,184 A | 9/2000 | Takahama | |
| 6,119,237 A | 9/2000 | Cho | |
| 6,213,438 B1 | 4/2001 | Ostby et al. | |
| 6,330,669 B1 | 12/2001 | McKeeth | |
| 6,381,133 B1 | 4/2002 | Chen | |
| 6,386,413 B1 | 5/2002 | Twyford | |
| 6,585,201 B1 | 7/2003 | Reed | |
| 6,605,924 B2 | 8/2003 | Tanaka et al. | |
| 6,674,637 B2 | 1/2004 | Shin et al. | |
| 6,697,972 B1 | 2/2004 | Oshima et al. | |
| 6,711,605 B2 | 3/2004 | Sekiguchi et al. | |
| 6,715,016 B1 | 3/2004 | Ohno et al. | |

(Continued)

*Primary Examiner*—Thomas Lee
*Assistant Examiner*—Zahid Choudhury
(74) *Attorney, Agent, or Firm*—Gardner Groff Greenwald & Villanueva, PC

(57) ABSTRACT

A computing device is booted in a manner that enables a software application to begin execution with minimal delay. When the device is powered up, a first processor system begins booting under control of a first operating system, and a second processor system begins booting under control of a second operating system. The first operating system is of a type that generally takes longer to complete booting than the second operating system. As soon as the second processor system has booted up, it begins controlling execution of a software application. Then, when the first processor system has booted up, control over the software application is transferred from the second processor system to the first processor system.

22 Claims, 3 Drawing Sheets

U.S. PATENT DOCUMENTS

| | | | |
|---|---|---|---|
| 6,727,920 B1 | 4/2004 | Vineyard, Jr. et al. | |
| 6,742,070 B2 | 5/2004 | Fuchida | |
| 6,763,458 B1 * | 7/2004 | Watanabe et al. | 713/100 |
| 6,768,652 B2 | 7/2004 | DeLuga | |
| 6,813,145 B2 | 11/2004 | DeLuga | |
| 6,833,989 B2 | 12/2004 | Helot et al. | |
| 6,892,261 B2 * | 5/2005 | Ohno et al. | 710/260 |
| 6,898,076 B2 | 5/2005 | Pappalardo et al. | |
| 6,917,989 B1 | 7/2005 | Inque | |
| 6,928,542 B2 | 8/2005 | Wen et al. | |
| 6,961,870 B2 | 11/2005 | Chiu et al. | |
| 6,996,828 B1 | 2/2006 | Kimura et al. | |
| 7,068,503 B2 | 6/2006 | Kamimaki et al. | |
| 7,409,536 B2 * | 8/2008 | Guo et al. | 713/1 |
| 7,523,269 B2 * | 4/2009 | Panabaker et al. | 711/147 |
| 7,529,921 B2 * | 5/2009 | Stein et al. | 713/1 |
| 2001/0018717 A1 * | 8/2001 | Shimotono | 709/319 |
| 2002/0143844 A1 | 10/2002 | Tsai | |
| 2003/0036843 A1 * | 2/2003 | Okude et al. | 701/200 |
| 2003/0114941 A1 | 6/2003 | Bass et al. | |
| 2003/0159026 A1 * | 8/2003 | Cupps et al. | 713/1 |
| 2003/0177276 A1 | 9/2003 | Chiu et al. | |
| 2003/0198015 A1 | 10/2003 | Vogt | |
| 2004/0066620 A1 | 4/2004 | Grunow et al. | |
| 2004/0088465 A1 | 5/2004 | Bianchi | |
| 2004/0090742 A1 | 5/2004 | Son et al. | |
| 2004/0150944 A1 | 8/2004 | Byrne et al. | |
| 2004/0153834 A1 * | 8/2004 | Oshima et al. | 714/38 |
| 2004/0205755 A1 * | 10/2004 | Lescouet et al. | 718/100 |
| 2004/0210848 A1 | 10/2004 | Vineyard, Jr. et al. | |
| 2005/0047081 A1 | 3/2005 | LaPorte et al. | |
| 2005/0060467 A1 | 3/2005 | Wieck | |
| 2005/0111181 A1 | 5/2005 | Schlesener et al. | |
| 2005/0111182 A1 | 5/2005 | Lin et al. | |
| 2005/0144434 A1 * | 6/2005 | Taylor et al. | 713/2 |
| 2005/0149933 A1 | 7/2005 | Saito et al. | |
| 2005/0273663 A1 * | 12/2005 | Yoon | 714/36 |
| 2006/0061964 A1 | 3/2006 | Cheng | |
| 2006/0085584 A1 | 4/2006 | Chen et al. | |
| 2006/0092605 A1 | 5/2006 | DeLuga et al. | |
| 2006/0133362 A1 | 6/2006 | Stein et al. | |
| 2006/0143354 A1 | 6/2006 | Tsai et al. | |
| 2006/0161713 A1 | 7/2006 | Belady | |
| 2008/0162983 A1 * | 7/2008 | Baba et al. | 714/3 |

\* cited by examiner

RAPID-BOOT COMPUTING DEVICE WITH DUAL OPERATING SYSTEMS

CROSS-REFERENCE TO RELATED APPLICATION

Co-pending U.S. patent application Ser. No. 11/535,810, filed Sep. 27, 2006, entitled "COMPUTING DEVICE WITH REDUNDANT, DISSIMILAR OPERATING SYSTEMS," is related by subject matter.

BACKGROUND OF THE INVENTION

1. Field of the Invention

The present invention relates generally to computing systems and, more specifically, to a computing device that enables software applications to run almost immediately after the device is started.

2. Description of the Related Art

When a computer is powered-up or otherwise started (or re-started), application programs generally cannot execute immediately. Rather, there is some delay during which the computer performs a process generally referred to as "booting" or "booting up." "Booting" is a term that has largely supplanted the original term, "bootstrapping," which was an allusion to the English expression "to pull oneself up by one's bootstraps." When a computer boots, a lower-level program, i.e., a sequence of instructions or code, which is capable of executing almost immediately after the computer is started, activates a higher-level program that is not otherwise capable of activating itself. In a traditional boot sequence, the processor executes some instructions that are embodied in a logic layer close to the hardware layer, such as in read-only memory (ROM), which in turn causes some additional instructions to be loaded from a disk drive or other secondary storage into random-access memory (RAM), where the processor begins executing them. In many computer architectures, the code stored in ROM is commonly referred to as the Basic Input/Output System or BIOS. Some of the instructions executed during boot-up cause the computer to be configured and prepared to execute application programs. "Application program" refers to high-level software, generally of the type with which the user interacts in some manner. The boot sequence is generally deemed completed when control is passed to the user interface layer of the operating system, and the computer allows a user to run application programs or log in.

There are a number of operating systems that are commercially available or otherwise known, but MICROSOFT WINDOWS is by far the most popular operating system in use today. However, while WINDOWS offers many advantages, it typically involves an elaborate boot sequence and, consequently, is often perceived as slow to boot up. After the processor executes BIOS, control is transferred to a partition loader, which locates the operating system and enables it to be loaded. In the case of WINDOWS XP, for example, a system downloading file then causes the operating system to be loaded in four phases: initial boot loader phase; operating system selection; hardware detection; and configuration selection. In the final phases, a device driver switches the screen to graphics mode, the WINDOWS XP desktop appears on the screen, and the user is invited to log on. Depending upon processor speed, memory, configurations, and other factors, the WINDOWS XP boot process can take between about 30 seconds and three or four minutes. Yet, despite being slow to boot up in comparison with other operating systems, the various versions of WINDOWS (e.g., WINDOWS XP, WINDOWS 2000, etc.) constitute perhaps the most popular family of operating systems in the world for desktop and laptop computers and servers, with a wealth of commercially available application programs having been written for them by various parties. Most computer users are familiar with and comfortable with WINDOWS. Thus, despite the slowness of its boot sequence, WINDOWS remains the operating system of choice for most desktop, laptop and similar computing devices.

In some instances, it is important that a user be able to ready a computing device for operation under the control of application programs without significant delay. For example, the amount of time that computing devices that control certain critical physical systems take to become ready for operation after they are powered up or otherwise started should be minimized. While in some instances such computing devices may be embedded in the systems they control (and thus control the physical systems through efficient hardware-level interaction), in other instances such computing devices may be ordinary desktop or laptop computers that control the physical systems through application programs and external bus or wireless interfaces. The problem is not limited to controlling physical systems but rather includes any instance in which an application program needs to be immediately ready for use. In any instance in which an computing device relies upon an application program to perform critical tasks, several minutes of boot-up delay can be detrimental.

Some operating systems, including those of the UNIX family, such as LINUX, generally boot up faster than WINDOWS in instances in which they are operating on comparably configured computing systems. However, LINUX operating systems are considered by some to be more suitable for network server computers, engineering design computers, industrial computers, etc., than for ordinary home and business computers because they are not as user-friendly or because they allow greater access to internal functions that can be misused. For these reasons, there are far more commercially available application programs for WINDOWS systems than LINUX systems.

The contrast between WINDOWS and LINUX is intended only as an example, as each of the operating systems that is commercially available or otherwise known has its own advantages and disadvantages in comparison with the others. Some boot up faster than others on comparably configured computing systems. Some have more features than others or have a greater selection of application programs available for them.

Accordingly, it would be desirable to provide a method and system to enable application programs to begin execution with minimal boot-up delay. It is to such a method and system that the present invention is primarily directed.

SUMMARY OF THE INVENTION

The present invention relates to booting a computing device in a manner that enables a software application to begin execution with minimal delay. In accordance with an exemplary embodiment of the invention, when an indication to start is detected, a first processor system begins booting under control of a first operating system, and a second processor system begins booting under control of a second operating system. The first operating system is of a type that generally takes longer to complete booting on a computer system than the second operating system takes on a comparably configured computer system. For example, the first operating system can be WINDOWS, while the second operating system can be LINUX. As soon as the second processor system has booted up, it begins controlling execution of a software application. Then, when the first processor system has booted up, control over the software application is transferred from the second processor system to the first processor system.

The invention can allow software applications to begin executing as soon as possible under a faster-booting but temporary or secondary operating system, while a processor system operating under a slower-booting primary operating system completes booting. For example, it maybe desirable for an application program that controls systems in an emergency responder vehicle, such as a police, fire or emergency medical vehicle, to begin executing as soon as possible after the vehicle or its computing device is started, even though a different primary operating system may be more desirable in the longer term for user convenience or other reasons.

DETAILED DESCRIPTION

Figure 1:
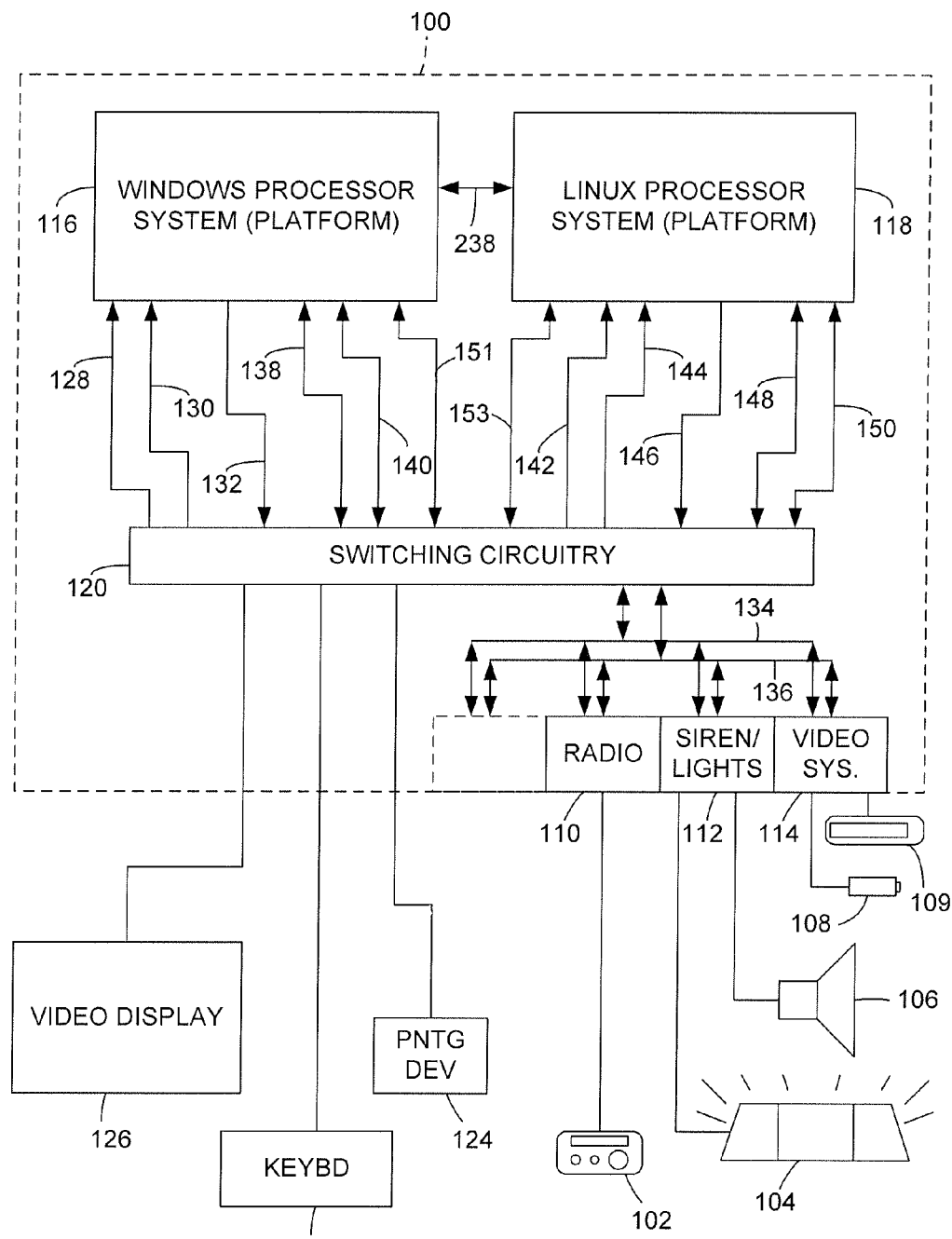
FIG. 1 is a block diagram of a system for booting a computing device in an emergency responder vehicle in a manner that enables a software application to begin execution with minimal delay, in accordance with an exemplary embodiment of the invention.

As illustrated in FIG. 1, in an exemplary embodiment of the present invention a mobile computing device 100 is used in an emergency responder vehicle, such as a police, fire or emergency medical vehicle, to control various systems associated with emergency vehicle operations, such as a radio 102, beacon light bar 104, siren 106, and a video camera 108 and associated video recorder 109. Computing device 100 includes user-removable/installable modules 110, 112, 114, etc., which control, monitor or otherwise interface with such emergency responder vehicle systems. The modular control concept is described in co-pending U.S. patent application Ser. No. 11/535,803, filed Sep. 27, 2006, entitled "MOBILE COMPUTING DEVICE WITH MODULAR EXPANSION FEATURES," the specification of which is incorporated herein in its entirety by this reference.

The modules 110, 112, 114, etc., in turn interface with first and second processor systems 116 and 118 through switching circuitry 120. Importantly, one of first and second processor systems 116 and 118 operates under an operating system that generally completes booting faster than the other in comparably configured computing systems. For example, first processor system 116 can operate under the MICROSOFT WINDOWS operating system, and second processor system 118 can operate under the LINUX operating system. As a computer or processor system, together with its operating system, is sometimes referred to as a "platform," it can be said that in the exemplary embodiment of the invention first processor system 116 is a WINDOWS platform, and second processor system 118 is a LINUX platform. In most cases, a LINUX platform boots faster than a comparable WINDOWS platform.

A user, such as the vehicle driver, can interact with computing device 100 through conventional user interface elements, such as a keyboard 122, pointing device 124 and video display 126. Switching circuitry 120 couples the user interface elements to the one of processor systems 116 and 118 that is controlling computing device 100. For example, when first processor system 116 is controlling computing device 100, switching circuitry 120 couples keyboard 122 to a first processor keyboard signal input 128, couples pointing device 124 to a first processor pointing device signal input 130, and couples video display 126 to a first processor video signal output 132. Similarly, when first processor system 116 is controlling computing device 100, switching circuitry 120 couples the busses 134 and 136 that serve modules 110, 112, 114, etc., to first processor busses 138 and 140. For example, busses 134 and 138 can conform to the Universal Serial Bus (USB) standard, and busses 136 and 140 can conform to the Ethernet standard. Accordingly, when second processor system 118 is controlling computing device 100, switching circuitry 120 couples keyboard 122 to a second processor keyboard signal input 142, couples pointing device 124 to a second processor pointing device signal input 144, and couples video display 126 to a second processor video signal output 146. Similarly, when second processor system 118 is controlling computing device 100, switching circuitry 120 couples the busses 134 and 136 that serve modules 110, 112, 114, etc., to corresponding second processor busses 148 and 150. First and second processor systems 116 and 118 can also include RS-232 busses 151 and 153. Although in the exemplary embodiment of the invention switching circuitry 120 is the element that couples and uncouples corresponding inputs and outputs of the first and second processor systems 116 and 118 to and from the common elements of the system, e.g., the modules and the user interface elements, any other suitable means for coupling and uncoupling signals can be used in other embodiments. The terms "circuitry" and "switching" are not intended to imply specific electrical components or methods but rather are intended to encompass all suitable arrangements.

Either or both of first and second processor systems 116 and 118 can control the switching function. For example, second processor system 118 can transmit a message to switching circuitry 120 via (e.g., RS-232) bus 153 that causes switching circuitry 120 to uncouple first processor system 116 from control of device 100 and couple second processor system 118 into control of device 100.

Figure 2:
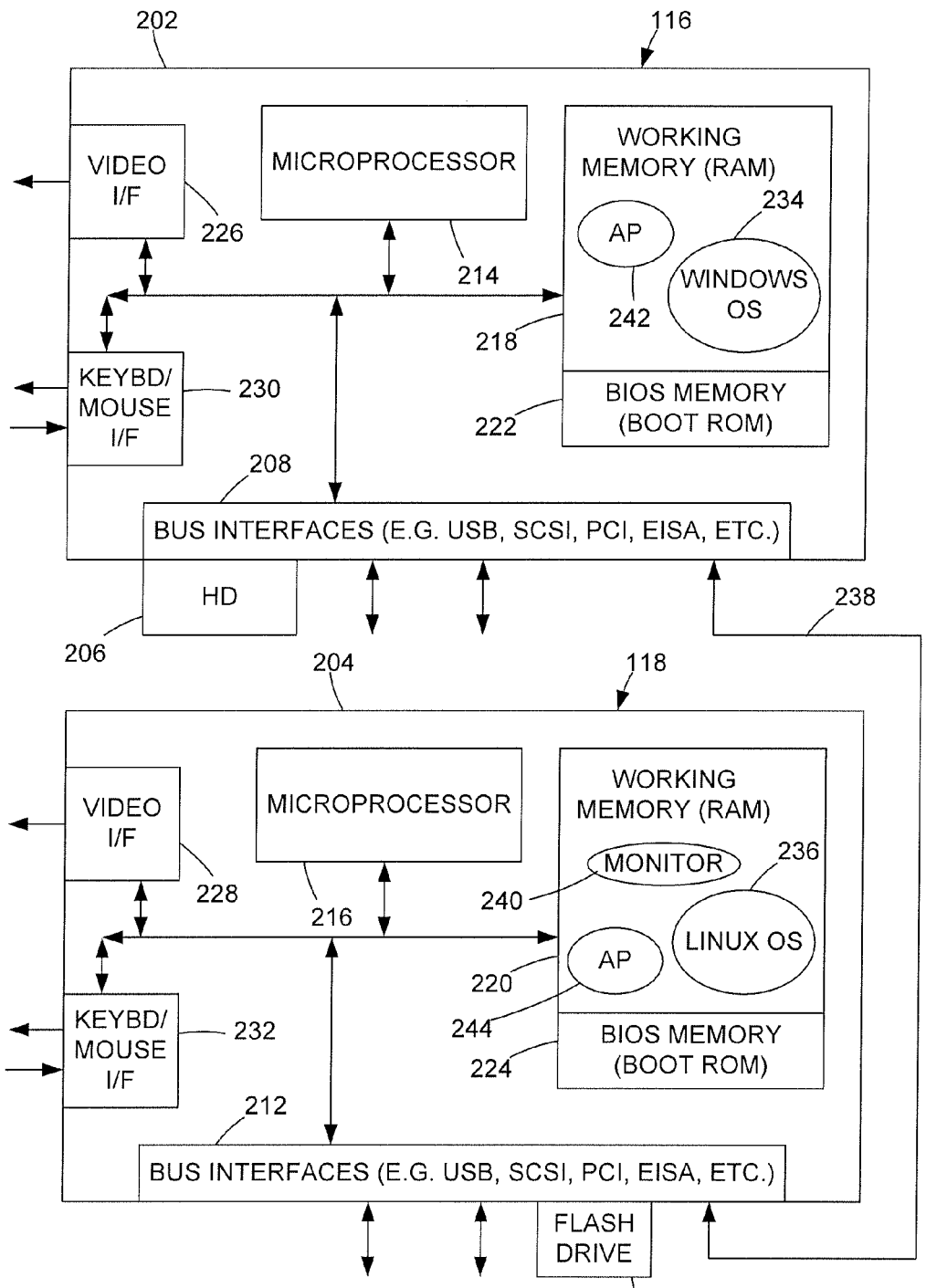
FIG. 2 is a block diagram of the dual processor systems or platforms of the system of FIG. 1.

As illustrated in FIG. 2, in the exemplary embodiment of the invention processor systems 116 and 118 comprise computer motherboards 202 and 204, respectively, of the type commonly included in personal desktop computers. Processor systems 116 and 118 can also include storage devices and other elements of the type commonly included in such computers. For example, processor system 116 includes a hard disk drive 206, which can interface with motherboard 202 through one of a number of standard bus interfaces 208 of the types commonly included in such computer motherboards (e.g., USB, SCSI, PCI, EISA, etc.). Similarly, processor system 118 can include a FLASH memory "drive" 210 that interfaces with motherboard 204 through one of a similar number of standard bus interfaces 212. Each of processor systems 116 and 118 has at least one processor 214 and 216, respectively, program and data working memory 218 and 220 (e.g., RAM), respectively, BIOS or boot-ROM memory 222 and 224, respectively, a video interface 226 and 228, respectively, and a keyboard/mouse interface 230 and 232, respectively. These elements are shown in FIG. 2 because they are representative of elements that are characteristic of typical, commercially available computers, but in other embodiments of the invention the processor systems can include any other suitable elements and have any other suitable architectures.

Although the WINDOWS and LINUX operating systems (i.e., software) 234 and 236 are illustrated as stored in or residing in memories 218 and 220, respectively, they are shown in this manner for purposes of illustration only, as persons skilled in the art to which the invention relates understand that such software elements are typically retrieved from non-volatile mass storage (e.g., hard drive 206 or FLASH drive 210, respectively) and executed in RAM by a respective processor 214 and 216 in portions or chunks on an as-needed basis, and may not reside in their entireties in RAM at any given time. The manner in which WINDOWS and LINUX operating systems 234 and 236 control their respective processor systems 116 and 118 is well understood by persons skilled in the art and is therefore not described herein.

Note that processor systems 116 and 118 can communicate with each other via at least one bus or signal, as indicated by the connection 238 between respective bus interfaces 208 and 212. It is through such a connection 238 that one of processor systems 116 and 118 can monitor the other and detect whether it is booted up and thus ready for operation, in the process of booting up, or in some other state, such as powered off. For this purpose, processor system 118 can execute a monitoring application program 240, shown for purposes of illustration as residing in memory 218. Under control of monitoring application program 240 (and, ultimately, operating system 236), processor system 116 is monitored to determine if it is booted up and ready for operation. For example, monitoring application program 240 can transmit a query to processor system 116. A corresponding application program (not shown) executing on processor system 116 can monitor for the query and transmit a response if it receives the query and is ready for operation.

Figure 3:
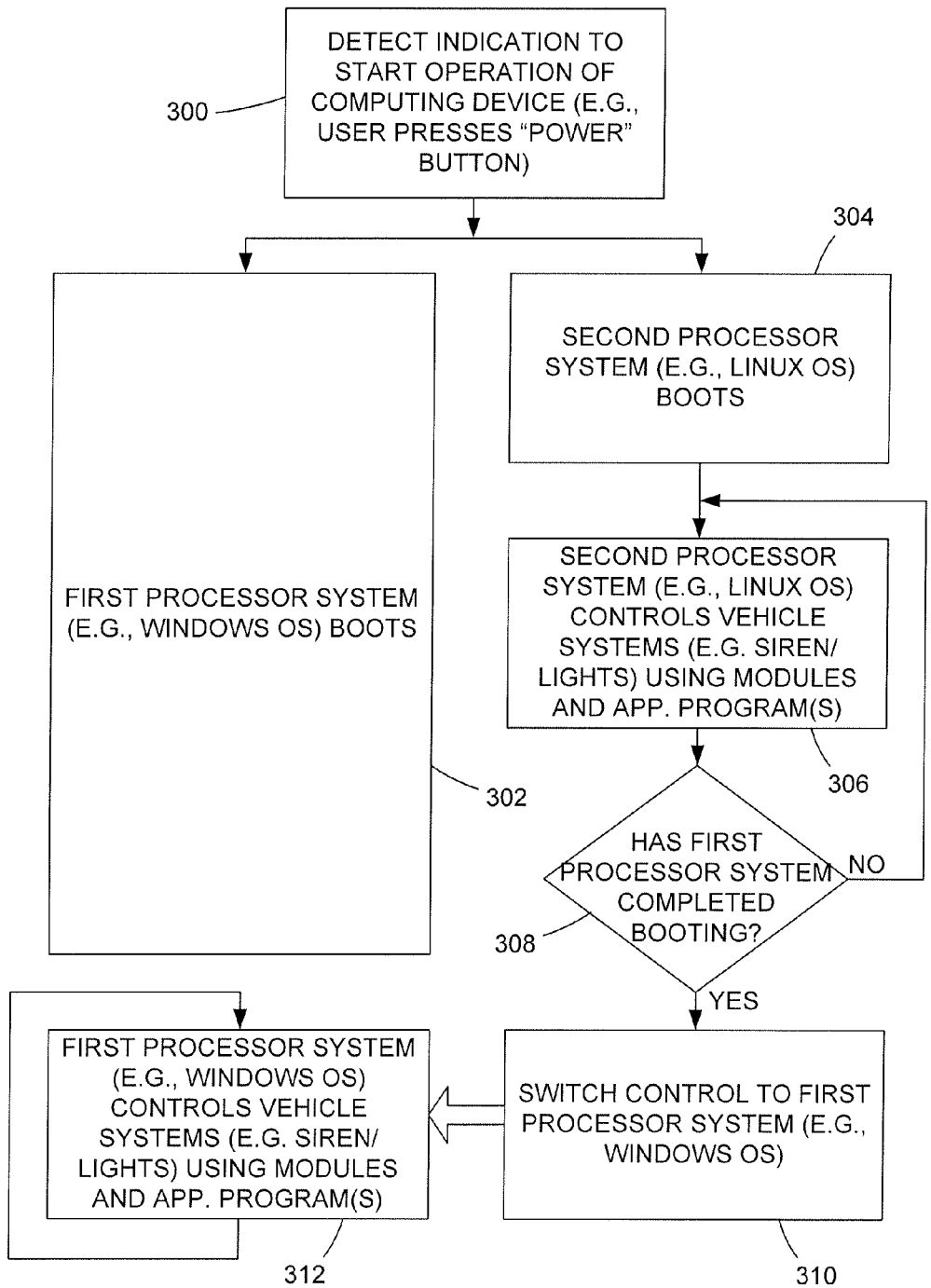
FIG. 3 is a flow diagram illustrating a method for booting the computing device of FIG. 1, in accordance with the exemplary embodiment.

Referring now to the flow diagram of FIG. 3, at step 300 the user (e.g., a driver or passenger in the emergency responder vehicle) turns on computing device 100 by pressing a Power button (not shown for purposes of clarity). For example, the emergency responder vehicle crew may receive a call from a dispatcher, advising them of an emergency, and they quickly enter the vehicle and turn on computing device 100 as they drive away. In other embodiments of the invention, there can be alternative means for indicating to computing device 100 that it is to start operation, such as a signal that is automatically generated when the driver turns the key in the vehicle ignition. Each of processor systems 116 and 118 senses the signal from the Power button or other source and responds to it in the conventional manner.

At steps 302 and 304, respectively, in response to the user having pressed the Power button, first processor system 116 and second processor system 118 begin booting. As a WINDOWS platform generally takes longer to boot than a LINUX platform, processor system 118 completes booting before processor system 116. (Step 302 is depicted in FIG. 3 as longer than step 304 to indicate the longer boot time.) As soon as processor system 118 has completed booting, it can begin to perform operations relating to the vehicle mission, such as controlling, for example, radio 102, beacon light bar 104, siren 106, and video camera 108 and recorder 109 (see FIG. 1) or other vehicle systems. More specifically, processor system 118 controls such vehicle systems or otherwise performs such other operations via an application program 244. Processor system 118 can continue performing such operations until it determines (e.g., from monitoring application program 240) that processor system 116 has completed booting, as indicated by step 308.

Although processor system 116 may be more broadly useful to the vehicle mission than processor system 118 because there are a greater number of commercially available application programs for WINDOWS platforms than for LINUX platforms, processor system 118 can be expected to complete booting before processor system 116. While processor system 116 continues through its boot process, processor system 118, having completed booting, can at least begin operations that may be deemed of more critical importance, such as controlling the beacon lights and siren as soon as the driver sets off toward the emergency scene. It may be several minutes later before processor system 116 completes booting, and it is desirable to not delay that long before certain systems, such as the beacon lights and siren, are activated. Thus, as soon as computing device 100 appears to be ready (i.e., when processor system 118 has completed booting), the user can initiate operations through the user interface.

Once processor system 118 determines (e.g., from monitoring application program 240) that processor system 116 has completed booting, processor system 118 causes control of computing device 100 to switch to processor system 116 at step 310. If application program 244 was involved in, for example, controlling the lights and siren before control was switched, then a corresponding application program 242 executing on processor system 116 can take over that involvement after control has been switched, as indicated by step 312. During the switchover from processor system 118 to processor system 116, there is essentially no interruption in control of most functions because at least the lower-level functions, such as keeping the beacon lights flashing and siren sounding, are under the immediate or direct control of modules 110, 112, 114, etc., and processor systems 116 and 118 are used only to effect higher-level functions, such as acting upon a user-input request to change the light flashing mode. In addition, any interruption of the application program that was executing on processor system 118 caused by the switchover to processor system 116 will be imperceptibly short (e.g., on the order of milliseconds) and have little or no effect.

It is contemplated that synchronization between instances of application programs executing on respective processor systems 116 and 118 during the switchover will not be necessary, as most operations that are important enough to ensure do not stop during the switchover will relate to low-level control functions, such as control of beacon lights and siren, which do not involve computation or a multiplicity of states. Nevertheless, in embodiments of the invention in which greater synchronization is required, such as if there is a high-level application program that a user may be using at the time of the switchover, persons skilled in the art are capable of providing means for more precisely maintaining continuity and synchronization between the application program instances during switching. For example, application program 242 can be made to cause a screen (not shown) to be displayed for the user that is the same as the screen that was displayed before the switch. In any event, following switching, computing device 100 continues to operate, at least in some respects, in the same manner as it did before switching, except that it operates under control of processor system 116.

Once control has been switched to processor system 116, the full capabilities of the WINDOWS platform can be made available for further operations. For example, processor system 116 may have various other application programs (not shown) that may not exist on processor system 118 because, for example, they are not commercially available in LINUX versions. It is contemplated that a greater number of application programs that relate in some way to the emergency vehicle mission or purpose will be commercially available in a WINDOWS version than in a LINUX version, and that therefore it will be desirable to switch from the LINUX platform to the WINDOWS platform as soon as the WINDOWS platform has completed booting.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for booting a computing device to enable a software application to begin execution rapidly, comprising:
   detecting an indication to start operating the computing device;
   booting under control of a first operating system by a first processor system in response to detection of the indication;
   booting under control of a second operating system by a second processor system in response to detection of the indication, the second operating system booting more rapidly than the first operating system;
   beginning execution of the software application under control of the second operating system executed by the second processor system when the second operating system completes booting on the second processor system; and
   transferring control over the software application to the first operating system executed by the first processor system when the first operating system completes booting on the first processor system.

2. The method claimed in claim 1, wherein the computing device comprises a mobile vehicular computing device for a motor vehicle.

3. The method claimed in claim 2, wherein the mobile vehicular computing device controls a system associated with the motor vehicle.

4. The method claimed in claim 3, wherein the system associated with the motor vehicle is a system of an emergency responder vehicle.

5. The method claimed in claim 4, wherein the system of an emergency vehicle is selected from the group consisting of: beacon light system; siren system; video recording system; and communication system.

6. The method claimed in claim 1, wherein the first operating system comprises WINDOWS.

7. The method claimed in claim 1, wherein the second operating system is of a UNIX operating system family.

8. The method claimed in claim 7, wherein the second operating system is LINUX.

9. The method claimed in claim 1, wherein:
   the first operating system comprises WINDOWS; and
   the second operating system comprises LINUX.

10. The method claimed in claim 1, wherein:
    the computing device comprises a mobile vehicular computing device for an emergency responder motor vehicle and controls a system associated with the emergency responder motor vehicle; and
    the system associated with the emergency responder motor vehicle is selected from the group consisting of: beacon light system; siren system; video recording system; and communication system.

11. The method claimed in claim 10, wherein:
    the first operating system comprises WINDOWS; and
    the second operating system comprises LINUX.

12. A system for booting a computing device to enable a software application to begin execution rapidly, comprising:
    a signal input for receiving an indication to start operating the computing device;
    a first processor system having a first operating system, the first processor system booting in response to detection of the indication to start operating; and
    a second processor system having a second operating system, the second processor system booting in response to detection of the indication to start operating, the second processor booting more rapidly than the first processor system, the second processor system beginning execution of the software application when the second processor system completes booting, and the second processor system transferring control over the software application to the first processor system when the first processor system completes booting.

13. The system claimed in claim 12, wherein the computing device comprises a mobile vehicular computing device for a motor vehicle.

14. The system claimed in claim 13, wherein the mobile vehicular computing device controls a system associated with the motor vehicle.

15. The system claimed in claim 14, wherein the system associated with the motor vehicle is a system of an emergency responder vehicle.

16. The system d claimed in claim 15, wherein the system of an emergency vehicle is selected from the group consisting of: beacon light system; siren system; video recording system; and communication system.

17. The system claimed in claim 12, wherein the first operating system comprises WINDOWS.

18. The system claimed in claim 12, wherein the second operating system is of a UNIX operating system family.

19. The system claimed in claim 18, wherein the second operating system is LINUX.

20. The system claimed in claim 12, wherein:
    the first operating system comprises WINDOWS; and
    the second operating system comprises LINUX.

21. The system claimed in claim 12, wherein:
    the computing device comprises a mobile vehicular computing device for an emergency responder motor vehicle and controls a system associated with the emergency responder motor vehicle; and
    the system associated with the emergency responder motor vehicle is selected from the group consisting of: beacon light system; siren system; video recording system; and communication system.

22. The method system claimed in claim 21, wherein:
    the first operating system comprises WINDOWS; and
    the second operating system comprises LINUX.

* * * * *